US005502014A

United States Patent [19]
Lee

[11] Patent Number: 5,502,014
[45] Date of Patent: Mar. 26, 1996

[54] NON-MAGNETIC CERAMIC SUBSTRATE MATERIAL

[75] Inventor: Won H. Lee, Seongnam-si, Rep. of Korea

[73] Assignee: Goldstar Co., Ltd., Seoul, Rep. of Korea

[21] Appl. No.: 343,774

[22] Filed: Nov. 22, 1994

[30]     Foreign Application Priority Data

Dec. 3, 1993 [KR] Rep. of Korea ............... 26355/1993

[51] Int. Cl.$^6$ .................................................. C04B 35/46
[52] U.S. Cl. .................... 501/135; 501/104; 501/105; 501/123; 501/125; 501/136
[58] Field of Search .................... 501/104, 123, 501/135, 136, 105, 125, 128

[56]     References Cited

U.S. PATENT DOCUMENTS 5,290,738   3/1994   Tomishima et al. ................ 501/123

Primary Examiner—Mark L. Bell
Assistant Examiner—Michael Marcheschi
Attorney, Agent, or Firm—John P. White

[57]     ABSTRACT

The present invention relates to non-magnetic ceramic substrate material for magnetic head having similar thermal expansivity to the metal magnetic thin film, abrasion resistance during contact traveling of the magnetic tape and good processability and thus increasing lifetime by preventing exfoliation and crack of the magnetic thin film. The material comprises 10–35 mol % of CaO, 10–40 mol % of TiO$_2$, 10–60 mol % of NiO and 10–50 mol % of CoO.

2 Claims, 1 Drawing Sheet

NON-MAGNETIC CERAMIC SUBSTRATE MATERIAL

BACKGROUND OF THE INVENTION

The present invention relates to non-magnetic material for magnetic head, and particularly to non-magnetic ceramic substrate material having increased lifetime by preventing exfoliation and crack of the magnetic thin film through using material for non-magnetic ceramic substrate having similar thermal expansivity to the metal magnetic thin film, low abrasion during contact travel of magnetic tape and good processability.

Recently, VTR head comes to have high performance as the function of the VTR comes to have high recording density.

Particularly, for the D-VTR (digital VTR) in which the velocity of the tape is faster than the conventional VTR, integrated head having low perturbation noise is used.

As for the conventional material for non-magnetic substrate material for such a head, barium titanate ($BaTiO_3$), calcium titanate ($CaTiO_3$), etc. are used.

However, since such material has thermal expansivity of $90-110 \times 10^{-7}/°$ C. which is lower than that of sendust or Fe based metal thin film material ($120-150 \times 10^{-7}/°$ C.) which was used as the metal magnetic thin film, exfoliation or crack of the metal magnetic thin film is produced. And these deteriorate electromagnetic characteristic of the magnetic head and lower processing yield.

To solve the above-mentioned problems, recently, CoO-NiO based material (Japanese Laid open Patent hei 3-80412) and MnO-NiO based material (Japanese Laid open Patent hei 4-95204) were applied to form non-magnetic substrate material which have thermal expansivity of $120-150 \times 10^{-7}/°$ C.

In the Japanese Laid open Patent hei 3-80412, $Co_xNi_{1-x}O_2$ ($0 \leq x \leq 0.2$), non-magnetic substrate material having rock salt-type structure is disclosed. The material has thermal expansivity of about $150 \times 10^{-7}/°$ C. and hardness of about 500–700 by Vikers.

In this Patent, material having no chipping and good processability could be obtained by using CoO-NiO based hot press and by manufacturing particle size thereof to 5 μm or less.

In the Japanese Laid open Patent hei 4-95204, $MnNiO_2$ having rock salt-type crystal structure is used as the non-magnetic substrate material. In this material 20–40 mol % of MnO, 50–80 mol % of NiO are contained as main components and one or more $Y_2O_3$, CaO, $Al_2O_3$, $ZrO_2$, etc. are contained to improve sintering characteristic and to adjust particle diameter. The thermal expansivity at this time is about 130–140.

In this patent, non-magnetic substrate consisting of 77–98 mol % of MnO as a main component and 2–23 mol % of $TiO_2$ is disclosed. At this time, if the amount of MnO is less than 77%, the expansivity is less than $100 \times 10^{-7}$ and so the thermal expansivity of the metal magnetic thin film and non-magnetic substrate material could not coincide and if the amount of MnO exceeds 98%, pores having 5 μm or over come to be produced and sintering characteristic is deteriorated.

To improve this problem, 2–23 mol % of $TiO_2$ is added to MnO to eliminate the pores and to improve sintering characteristic.

However, since the above-mentioned material such as barium titanate, calcium titanate, etc. have different thermal expansivity with the metal magnetic film, exfoliation or crack of the metal magnetic thin film is produced and this deteriorates electromagnetic characteristic and processing yield of magnetic head. And though CoO-NiO based material or MnO-NiO based material has high thermal expansivity, since their abrasion resistance are low, lifetime of the head decreases with the increase of the abrasion amount when travel velocity of tape is increased.

SUMMARY OF THE INVENTION

An object of the present invention is to solve the problem by employing non-magnetic ceramic substrate material having different chemical composition from the conventional one and so by approaching the thermal expansivity to the metal magnetic thin film and imparting abrasion resistance.

To accomplish the above object, there is provided in the present invention non-magnetic ceramic substrate material for magnetic head comprising 10–35 mol % of CaO, 10–40 mol % of $TiO_2$, 10–60 mol % of NiO and 10–50 mol % of CoO.

DETAILED DESCRIPTION OF THE INVENTION

Figure 1:
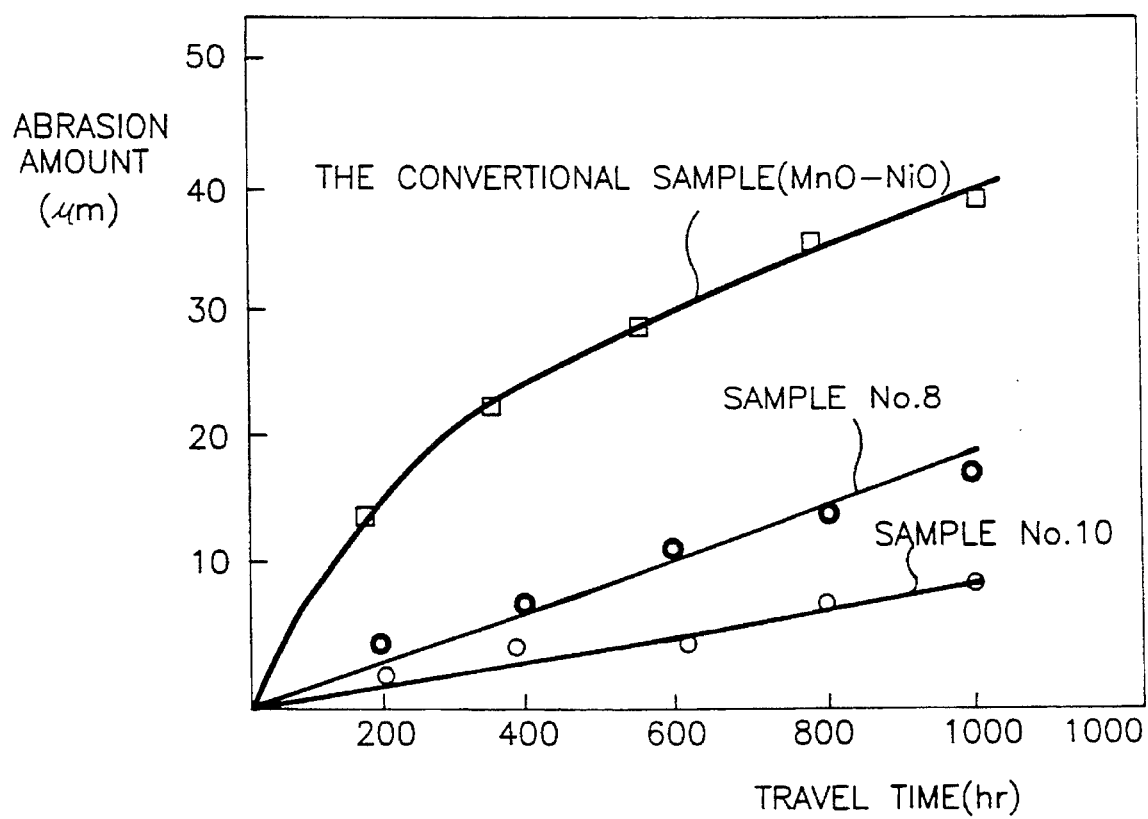
FIG. 1 is a graph showing abrasion variation of the magnetic head according to the travel time of the magnetic tape.

The present invention will be described in detail below.

The composition of the present invention comprises 10–35 mol % of CaO, 10–40 mol % of $TIC_2$, 10–60 mol % of NiO and 10–50 mol % of CoO. And one or more compounds among $SIC_2$, $Cr_2O_3$, $V_2O_3$ and $ZrO_2$ could be added at need.

The mixing amount of NiO and CoO is preferably 50–90 mol % in this composition.

If the amount is less than 50 mol %, the thermal expansivity becomes less than $120 \times 10^{-7}/°$ C. and if the amount exceeds 90 mol %, the sintering characteristic is deteriorated and large pores are possibly formed.

Thermal expansivity of $TiO_2$ is about $100 \times 10^{-7}/°$ C. If the amount of $TiO_2$ is less than 10 mol %, abrasion resistance is lowered, while the amount exceeds 40 mol %, liquid phase is formed resulting in abnormal crystal growth. This deteriorates processability and lowers the thermal expansivity to induce exfoliation of the metal magnetic thin film.

CaO reacts with $TiO_2$ to produce $CaTiO_3$ and of which thermal expansivity is about $110-120 \times 10^{-7}/°$ C. This is small when is compared with that of the metal magnetic thin film. However, if NiO and CoO having high thermal expansivity is mixed to the composition, the thermal expansivity of $CaTiO_3$ could be increased while maintaining its abrasion resistance.

At this time, if the amount of CaO is more than 35 mol %, CaO produces hydrate inducing deterioration of sintering characteristic and producing lots of pores.

Each composition is weighed in the range of mol % and wet mixed by means of alumina ball mill in pure water.

After drying, calcining at 900°–1100° C. for 2–3 hours, the mixture is pulverized by wet ball milling to the size of 3 μm.

Then 5–10% of 10% PVA was added, mixed and spray dried to the particle size of 100 μm.

After molding under 1–3 ton/cm², the particles are cold isostatically pressed under 2–5 ton/cm².

Then is sintered at 1250°–1450° C. for 2–5 hours under atmosphere and atmospheric pressure, and then hot pressed at 110°–1350° C. under 100–400 kg/cm² for 1–4 hours.

The thus obtained non-magnetic substrate has relative density of 99.5% or over and thermal expansivity of $130-150 \times 10^{-7}/°C$. which is similar to that of the metal magnetic thin film.

The particle size is about 2–4 μm and fine hardness is 800–950 Hv which is larger than that of the conventional material and so could improve abrasion resistance of the head.

And one or more compounds among $ZrO_2$, $Al_2O_3$, $Cr_2O_3$, $SiO_2$ and $V_2O_3$ could be added to the basic composition of $CaO$-$TiO_2$-$NiO$-$CoO$.

At this time, $ZrO_2$, $Al_2O_3$, $Cr_2O_3$, etc. have the characteristic of restraining crystal growth and so have improved hardness. However, if the added amount is less than 0.1 wt %, the effect could not be obtained and if the amount exceeds 5 wt %, the sintering characteristic is rather deteriorated.

And during sintering, liquid phase of $SiO_2$, $V_2O_3$, etc. could promote the densification of the material and prevent the production of the pores to harden. However, if the amount is less than 0.1 wt %, the effect could not be obtained and if the amount exceeds 5 wt %, the hardness and the thermal expansivity are decreased.

The present invention will be described in detail below.

Chemical components as shown in Table 1 are weighed and wet ball milled for 36 hours. Then calcined at 1000° C. for 2 hours.

After milling for 48 hours using alumina ball mill, the material is spray dried.

Molding under 1 ton/cm² to the size of 40×50×15 mm, cold isostatic pressing under about 2000 atm, sintering at 1350° C. for 2 hours and hot pressing at 1300° C. for 2 hours under 300 kg/cm² were sequentially carried out.

Physical properties of the thus obtained materials are illustrated in Table 1.

The thermal expansivity was $120-150 \times 10^{-7}/°C.$, fine hardness was 800–950 and particle diameter was 2–4 μm.

Physical properties of the materials obtained by adding $ZrO_2$, $Al_2O_3$, $SiO_2$, $Cr_2O_3$, $V_2O_3$, etc to $CaO$-$TiO_2$-($NiO$-$CoO$) base composition are illustrated in Table 2.

The attached drawing illustrates the variation of abrasion amount according to the travel time of the integrated head made of $CaO$-$TiO_2$-($NiO$-$CoO$) material of the present invention and the conventional $MnO$-$NiO$ material. It is shown that the abrasion amount of $CaO$-$TiO_2$-($NiO$-$CoO$) material is far less than that of $MnO$-$NiO$ material.

When accepting that about 15 μm abrasion corresponds to the lifetime limit, the lifetime of the head made of $MnO$-$NiO$ material is 200 hours, while the lifetime of the head made of $CaO$-$TiO_2$-($NiO$-$CoO$) material is 1000 hours or over.

Accordingly, in case of applying the material of the present invention as the substrate material of the integrated head of Digital VCR in which relative velocity of the tape is very fast, even better abrasion resistance could be obtained when is compared with the conventional material.

TABLE 1

| sample No. | composition (mol %) | | | | S.D. (g/cm²) | T.E.(× $10^{-7}$/°C.) | F.H. (kg/mm²) | P.D. (μm) |
|---|---|---|---|---|---|---|---|---|
| | CaO | TiO₂ | NiO | CoO | | | | |
| 1 | 25 | 25 | 30 | 20 | 5.18 | 135.4 | 872 | 2 |
| 2 | 20 | 30 | 30 | 20 | 5.19 | 127.2 | 877 | 2.5 |
| 3 | 15 | 35 | 30 | 20 | 5.21 | 120.1 | 882 | 3 |
| 4 | 10 | 40 | 30 | 20 | 5.22 | 115.4 | 915 | 3.2 |
| 5 | 20 | 20 | 30 | 30 | 5.48 | 140.2 | 848 | 3 |
| 6 | 15 | 25 | 30 | 30 | 5.49 | 132.4 | 850 | 3.3 |
| 7 | 10 | 30 | 30 | 30 | 5.50 | 125.3 | 890 | 3.5 |
| 8 | 15 | 15 | 40 | 30 | 5.82 | 145.2 | 854 | 3.3 |
| 9 | 10 | 20 | 40 | 30 | 5.84 | 135.2 | 866 | 3.6 |
| 10 | 5 | 25 | 40 | 30 | 5.85 | 126.1 | 877 | 3.6 |
| 11 | 10 | 10 | 40 | 40 | 6.15 | 149.2 | 845 | 3.5 |
| 12 | 5 | 15 | 40 | 40 | 6.16 | 139.0 | 850 | 3.7 |

*In the Table, S.D. represents sintering density, T.E. represents thermal expansivity, F.H. represents fine hardness and P.D. represents particle diameter.

TABLE 2

| sample No. | composition (mol %) | | | | A.A. (wt %) | S.D. (g/cm²) | T.E. (× $10^{-7}$ /°C.) | F.H. (kg/ mm²) | P.D. (μm) |
|---|---|---|---|---|---|---|---|---|---|
| | CaO | TiO₂ | NiO | CoO | | | | | |
| 1 | 20 | 20 | 30 | 30 | ZrO₂ 1.0 | 5.49 | 140.3 | 863 | 2.1 |
| 2 | 20 | 20 | 30 | 30 | Al₂O₃ 1.0 | 5.50 | 141.0 | 868 | 1.9 |
| 3 | 20 | 20 | 30 | 30 | Cr₂O₃ 1.0 | 5.48 | 140.7 | 870 | 2.0 |
| 4 | 20 | 20 | 30 | 30 | SiO₂ 1.0 | 5.49 | 140.5 | 875 | 2.5 |
| 5 | 20 | 20 | 30 | 30 | V₂O₅ 1.0 | 5.49 | 141.0 | 877 | 2.6 |
| 6 | 15 | 15 | 40 | 30 | ZrO₂ 2.0 | 5.50 | 145.3 | 869 | 2.5 |
| 7 | 15 | 15 | 40 | 30 | Al₂O₃ 2.0 | 5.51 | 145.2 | 864 | 2.6 |

TABLE 2-continued

| sample No. | composition (mol %) | | | | A.A. (wt %) | S.D. (g/cm$^2$) | T.E. ($\times 10^{-7}$ /°C.) | F.H. (kg/mm$^2$) | P.D. (μm) |
|---|---|---|---|---|---|---|---|---|---|
| | CaO | TiO$_2$ | NiO | CoO | | | | | |
| 8 | 15 | 15 | 40 | 30 | Cr$_2$O$_3$ 2.0 | 5.50 | 145.1 | 865 | 2.5 |
| 9 | 15 | 15 | 40 | 30 | SiO$_2$ 2.0 | 5.51 | 145.2 | 879 | 2.8 |
| 10 | 15 | 15 | 40 | 30 | V$_2$O$_3$ 2.0 | 5.51 | 145.1 | 882 | 2.8 |

*In the Table, A.A. represents additional agent, S.D. represents sintering density, T.E. represents thermal expansivity, F.H. represents fine hardness and P.D. represents particle diameter.

What is claimed is:

1. Non-magnetic ceramic substrate material for magnetic head comprising a basic composition of 10–35 mol % of CaO, 10–40 mol % of TiO$_2$, 10–60 mol % of NiO and 10–50 mol % of CoO, wherein 0.1–5.0 wt % of at least two compounds selected from the group consisting of ZrO$_2$, Al$_2$O$_3$, SiO$_2$, Cr$_2$O$_3$, and V$_2$O$_5$ are added to the basic composition.

2. Non-magnetic ceramic substrate material for magnetic head comprising a basic composition of 10–35 mol % of CaO, 10–40 mol % of TiO$_2$, 10–60 mol % of NiO and 10–50 mol % of CoO, wherein 0.1–5.0 wt % of one or more compounds selected from the group consisting of Al$_2$O$_3$, SiO$_2$, Cr$_2$O$_3$ and V$_2$O$_5$ are added to the basic composition.

* * * * *